Figure 1:
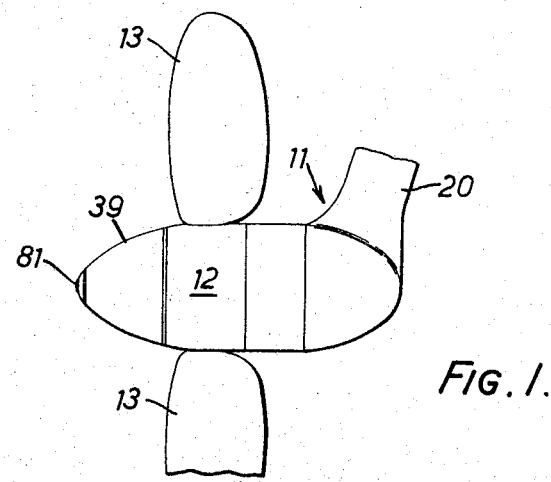

Sept. 5, 1967　　　R. T. ELMES ET AL　　　3,339,639
WIND MOTORS

Filed Sept. 2, 1965　　　　　　　　　　　　4 Sheets-Sheet 1

INVENTORS
ROBERT T. ELMES
BY JOHN A. CHILMAN

Orland M. Christensen
ATTORNEY

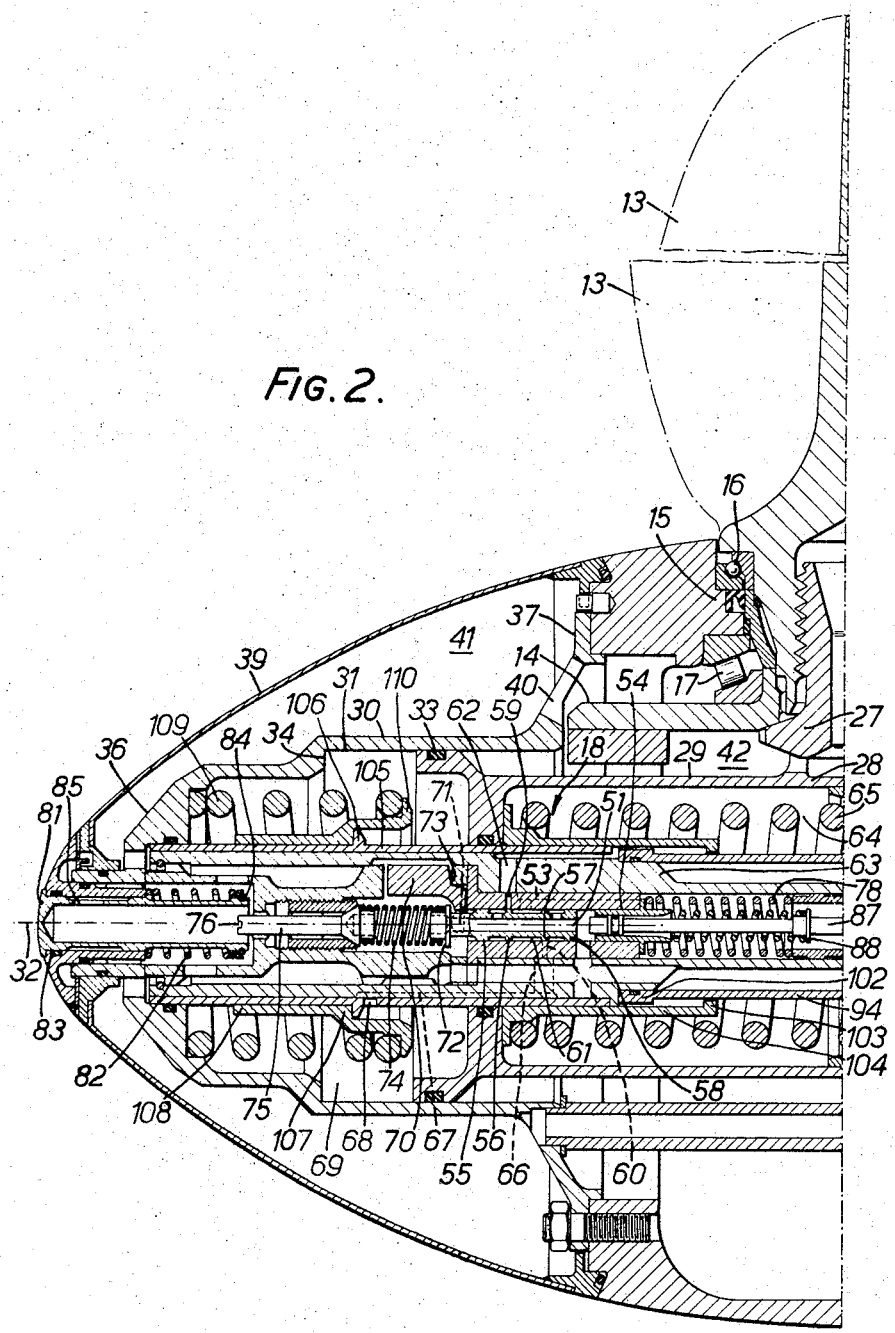

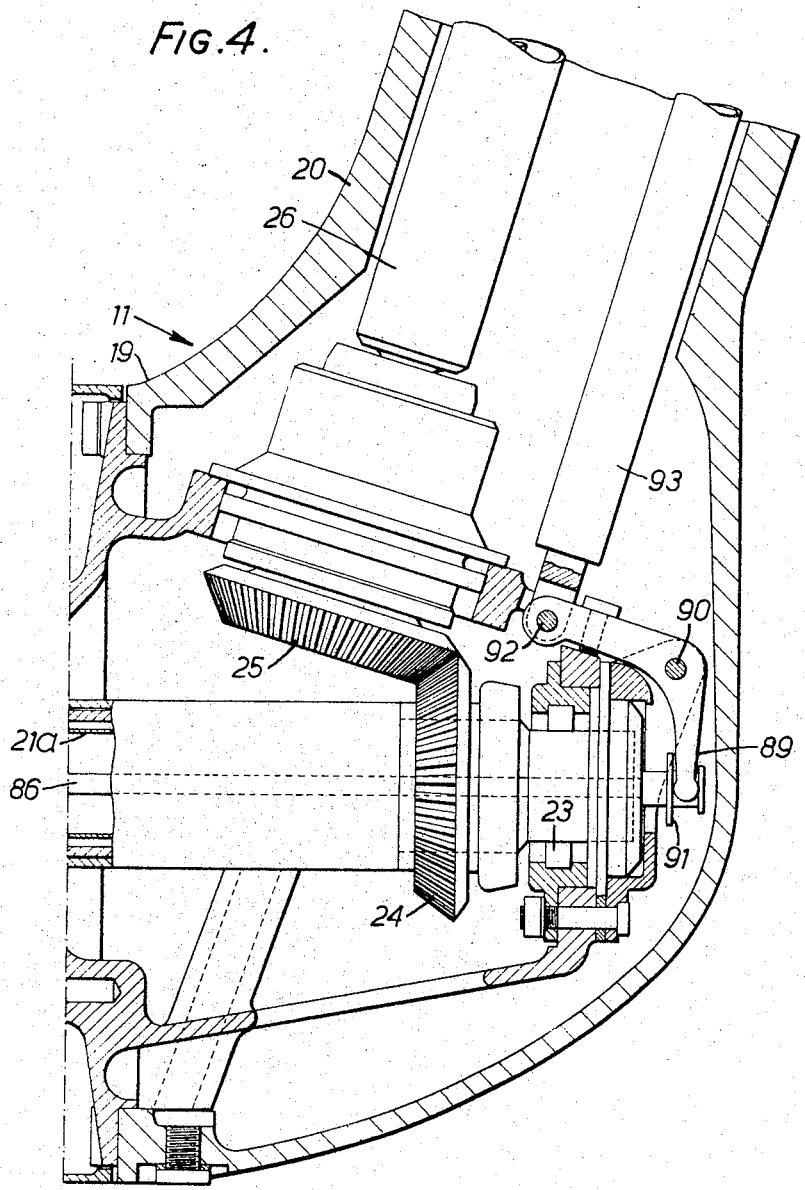

United States Patent Office 3,339,639
Patented Sept. 5, 1967

3,339,639
WIND MOTORS
Robert T. Elmes, Birdlip, and John A. Chilman, Painswick, England, assignors to Dowty Rotol Limited, Gloucester, England, a British company
Filed Sept. 2, 1965, Ser. No. 484,605
Claims priority, application Great Britain, Sept. 9, 1964, 36,919/64
14 Claims. (Cl. 170—160.21)

This invention relates to wind motors of the kind having a bladed rotor and suitable for use in vehicles, such as aircraft, for driving accessories, for example, hydraulic pumps, such wind motors being movable from a stowed inoperable position within the vehicle to an extended operable position externally of the vehicle and in the slip-stream thereof, and being retractable from the extended position to the stowed position when their operation is no longer required.

According to this invention, such a wind motor comprises in combination:

(a) a body portion, having pivotal mounting means to afford the wind motor its extendability and retractability, (b) a bladed rotor mounted for rotation upon the body portion, such rotation occurring when the wind motor is in its extended condition, (c) positioning means operable to ensure that the bladed rotor is stopped in a predetermined rotational position so that the wind motor presents its overall smallest cross-sectional area to an opening in the wall of the vehicle for retraction of the wind motor through that opening, and, (d) speed - governor - controlled hydraulically - operable pitch-changing mechanism for adjusting the pitch of the blades to maintain substantially constant speed operation of the rotor, a piston-and-cylinder device, forming part of said mechanism, being operably connected to the blades and having displaceable stop means which, when the governor is overridden to initiate stopping of the rotor prior to retraction, permits movement of the blades just into the reverse pitch range, but which, when the rotor has been stopped in said predetermined rotational position and after retraction has commenced, is automatically displaceable then to move the blades just back into the positive pitch range.

In this way, when for operation the wind motor is re-extended into the slip-stream, the blades are in a pitch condition whereby starting of the rotor, and of the accessory or accessories it drives, occurs as soon as the rotor is unlocked whereupon the speed governor is operable to permit the rotor to attain its substantially constant rotational speed.

The displaceable stop means may comprise an abutment sleeve normally spring-urged against a shoulder formed upon a core member within the cylinder of the piston-and-cylinder device, an abutment formed on the abutment sleeve lying in the path of movement of the piston of the piston-and-cylinder device thereby to form a stop which corresponds to a coarse pitch starting angle of the blades. The abutment sleeve is so constructed that when the piston is urged under hydraulic pressure onto the sleeve upon overriding of the governor, the spring load is overcome so that the sleeve is moved away from the shoulder on the core member to permit the piston to move further just into the reverse pitch range.

An accumulator may be provided in operable association with the piston-and-cylinder device and operable to maintain the abutment sleeve in the reverse pitch position during stopping of the rotor, but as the wind motor is being retracted or after it has been retracted, the accumulator is caused to be no longer effective to maintain the abutment sleeve in the reverse pitch position, so that the sleeve moves back to its position of engagement with the shoulder formed on the core member, this position corresponding to the starting pitch angle of the blades.

Figure 5:
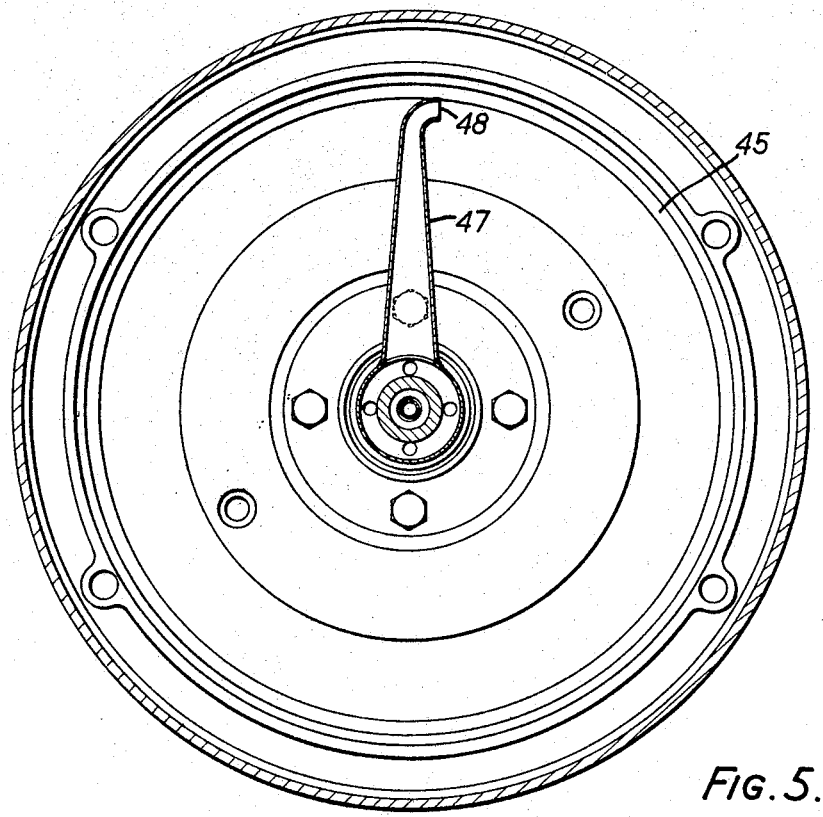
Figure 3:
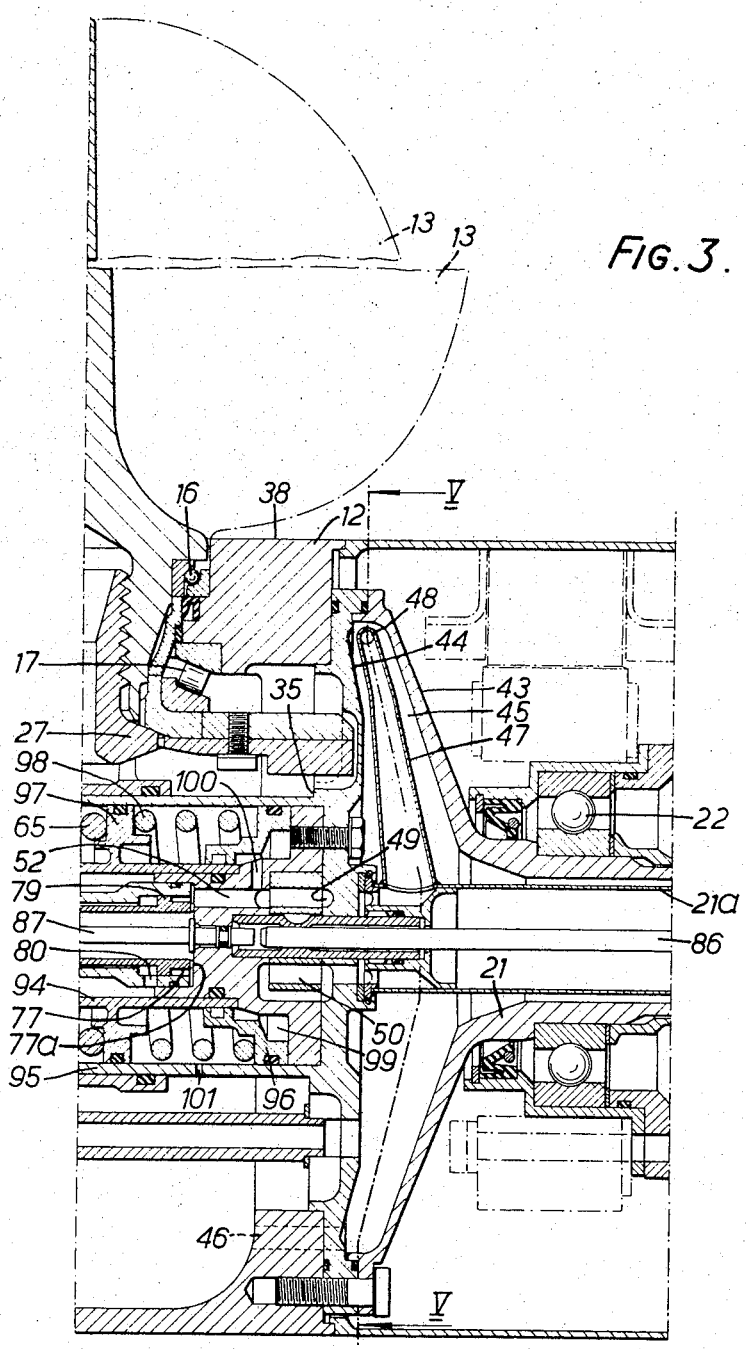

One emodiment of the invention will now be particularly described by way of example with reference to the accompanying drawings, of which, FIGURE 1 is a side elevation of a wind motor for use in an aircraft for driving accessories, FIGURES 2, 3 and 4 together form a 120 degree cross-sectional view of the wind motor shown in FIGURE 1, and, FIGURE 5 is a cross-section taken along the line V—V on FIGURE 3.

Referring to these drawings, a wind motor comprises what is more commonly known as a ram air turbine, generally indicated at 11, having a rotor 12 which includes two blades 13. The blades are mounted in the hub 14 of the rotor by means of a bearing assembly 15, each bearing assembly comprising an outer ball bearing 16 and an inner roller bearing 17. In this way the blades are rotatable about their longitudinal axes and thus are variable as to pitch, pitch adjustment being effected by an hydraulic pitch-changing mechanism, generally indicated at 18, provided in the hub 14.

The fixed part 19 of the ram air turbine has a leg 20 which is arranged for pivotal mounting in a manner (not shown) upon a fixed structural part of the aircraft, jack means (also not shown), being provided so that the turbine is extendible into the slip-stream of the aircraft for operation, and is retractable back into a stowage zone within the aircraft when its operation is no longer required.

The rotor 12 is mounted upon a shaft 21 itself carried in bearings 22 and 23 housed in the fixed part 19. A bevel gear 24 mounted upon the shaft 21 is in mesh with a bevel gear 25, in turn mounted upon a shaft 26 which passes up through the leg 20 to drive the accessories within the aircraft in conventional manner.

Retaining means 27 are provided for the bearing assemblies 15 at the root end portions of the blades, these portions having crank pins (not shown) formed upon them. The crank pins engage an extension 28 of the hollow piston rod 29 of a telescopic hydraulic pitch-change motor 30. The cylinder 31 of this motor is of annular form and is arranged so that its longitudinal axis is coincident with the axis 32 of rotation of the rotor 12. The piston 33 of the pitch-change motor 30 is slidable axially within the cylinder 31, its movement in either direction being limited by end stops 34 and 35. The stop 34 is an "over-feather" stop just inside the negative pitch range and the stop 35 is the fine pitch stop. The cylinder 31 of the motor 30 is closed at 36 at its forward end, but at its rearward end is flanged at 37 and thereby connected to that part of the hub structure 14 which supports the blades 13. The external surface of the latter part of the hub structure provides part 38 of a stream-line spinner surface for the rotor 12, the nose portion of the spinner being formed by a sheet metal pressing 39 which is secured to the forward part of the assembly in convenient manner.

The flanged portion 37 of the pitch-change motor cylinder 31 is apertured at 40 to place the annular space 41 formed between the nose pressing 39 of the spinner and the motor in communication with an annulus 42 formed within that part of the hub 40 carrying the blades 13. In this way an annular reservoir for hydraulic fluid is formed in the rotating part of the ram air turbine assembly.

The shaft 21 upon which the ram air turbine rotor 12 is mounted has a large diameter dished portion 43 by which it is connected to the rearward face 44 of the blade-carrying part of the hub structure, thereby forming a chamber 45 which is in communication with the annular reservoir 41/42 through suitable apertures 46. Positioned within this chamber 45 in a manner so that it is fixed and cannot rotate with the rotor 12 is a scoop 47. This scoop, which is fixed to a tubular member 21a within the shaft 21, is radially-outwardly directed and formed with a nozzle 48 at its radially-outer end portion. The interior of the scoop is in communication with the inlet side 49 of a positive-displacement rotary pump 50 mounted centrally of the rotor 12 in a manner such that it is driven with rotation of the rotor. The axis of rotation of the rotor of this pump is coincident with that of the bladed rotor. The pump 50 is arranged to deliver hydraulic fluid under pressure to a control valve in the form of a spool 51. Communication from the pump to the spool is by way of passages 52 and 53. The spool 51 is slidable axially in a bore 54 co-axial with the axis 32 and has a number of lands 55, 56, 57 and 58. When the spool is in its equilibrium position the land 56 closes over a port 59 while the land 57 closes over a port 60. The passageway 53 opens into an annulus 61 formed between the lands 56 and 57.

The port 59 registers with a port 62 in a core member 63. The port 62 communicates with a chamber 64 on the right-hand side in FIGURE 2 of the drawings of the piston 33. This chamber 64 is the coarse pitch chamber and contains a coil spring 65 which biasses the piston 33 in the pitch-coarsening direction.

The port 60 registers with a further port 66 which in turn communicates through a passageway 67 and a port 68 with a chamber 69 formed on the left-hand side in FIGURE 2 of the drawings of the piston 33, this chamber being the fine pitch chamber.

The control valve spool 51 is adjustable on either side of the equilibrium position in dependence upon rotational speed by a pair of governor fly-weights 70, the tails 71 of which engage a flange 72 formed on the spool. The fly-weights are mounted on knife-edges 73. Upon a change in the rotational speed of the rotor 12, the governor fly-weights 70 move either radially-inwardly or radially-outwardly about their knife-edges 73 and the resultant axial adjustment in the position of the spool is such that fluid under pressure delivered by the pump 50 to the control valve spool passes to either one side or the other of the piston 33 of the pitch-change motor. Consequent displacement of the piston 33 and its hollow piston rod 29 results in pitch adjustment either in the pitch-fining or in the pitch-coarsening direction, as required by the governor fly-weights, to maintain the turbine rotor operating at the rotational speed determined by the setting of a speeder spring 74 which engages the spool.

Variation in the setting of the speeder spring 74 is afforded by a screw-threaded adjuster 75 having a screw-driver slot 76. The pump 50 has a pre-set relief valve element 77 housed within the core member 63 at its end portion remote from the governor fly-weights. Pump delivery normally occurs through slots 77a in the end face of the relief valve element 77 to the interior thereof and thence to the control valve spool 51, but when the pressure exceeds a predetermined value, the relief valve element is displaced forwardly in the drawing against the effort of the coil spring 78 so that the land 79 of the relief valve element places pump delivery in communication with drain through the port 80.

A hollow slidable plug 81 is provided in the nose portion 39 of the spinner, this plug being retained by a coil spring 82 and having seals 83 and 84 associated therewith. The slidable plug has an aperture 85 and is retained in such a manner that when pulled out to an extended condition it provides a filler for the reservoir 41/42, but when pressed and locked (in convenient manner) into the spinner, it is held there in sealed engagement therewith. The plug is so constructed as when extended to provide a ready means of access for rotation of the screw-threaded means 75 for adjustment of the datum setting of the governor speeder spring 74.

Suitable passageways are provided in the hub structure for communicating the outlet of the relief valve of the pump, and also the drain side of the spool valve of the governor, with the annular reservoir 41/42.

A rod member 86 extends in co-axial manner along and beyond the length of the fixed part 19 of the ram air turbine, this rod member being engageable at its forward end portion with a further rod member 87 co-axially arranged within the hub structure and at its forward end portion being engageable with the rearward end portion of the control valve spool 51. The rod member 87 is normally held dis-engaged from the control valve spool by a coil spring 88. At that end portion of the rod member 86 remote from the hub, a bell-crank lever 89, pivotally mounted upon the fixed part 19 at 90, is engageable with a flange 91 secured to the rod member. The bell-crank lever is pivotally connected at 92 to one end portion of a rod member 93 which extends upwardly through the hollow interior of the leg 20 in parallel with the shaft 26. This rod member is operated automatically by suitable cam means (not shown) positioned at the point of pivotal connection of the leg 20 to the aircraft structure.

The purpose of the rod members 86, 87 and 93 is to provide means for overriding the governor 70 and displacing the spool 51 forwardly to effect such adjustment of the pitch-change motor 30 as to move the blades 13 into the feathered condition. The cam means is so arranged that when it is desired to retract the ram air turbine, initial controlling movement displaces the rod members 86, 87 and 93 to override the governor so that the blades 13 move into the feathered condition, but during the retraction movement such displacement of the rod members 86, 87 and 93 is automatically cancelled so that the spool is again under control of the governor.

A sleeve 94 which extends co-axially along the length of the chamber 64 is provided with a partition member 97 which is a sealing fit in a tubular member 95 which is formed integrally with the blade-carrying part of the hub structure and which extends forwardly in the drawing. Mounted within the tubular member 95 is an annular piston 96 which is urged to the right in the drawing by a coil spring 98. An annular chamber 99 is thus formed to the right in the drawing of the piston 96 and is in communication through a port 100 with the passage 52 on the outlet side of the pump 50. The chamber 99, the piston 96, the tubular member 95 and spring 98 provide an hydraulic accumulator effective in the supply line from the pump to the pitch-change motor 30. The underside of the piston 96 is placed in communication with reservoir through an opening 101 in the tubular member 95.

A shoulder portion 102 is provided at the forward extremity of the sleeve 94 and is co-operable with a stop 103 formed upon a further sleeve 104 itself held against the right-hand face of the piston 33 by the coil spring 65. When engaging the shoulder portion 102 the stop 103 corresponds to a relatively coarse pitch setting of the blades appropriate for starting of the bladed rotor when ejected into the slip-stream.

A further sleeve 105 is provided around the governor and control valve assembly, this sleeve having a shoulder 106 engageable with a shoulder 107 formed upon an abutment sleeve 108 itself mounted upon the sleeve 105 and axially-displaceable with respect thereto. The abutment sleeve 108 is normally urged into engagement with the shoulder 106 by a coil spring 109 which engages a further shoulder 110 on the abutment sleeve. The shoulder 110 forms a stop for the piston 33 of the pitch change motor 30, but since the abutment sleeve forms a displaceable stop member, when the piston 33 is moved forwardly under sufficient pressure, yielding of this stop member occurs, the sleeve 108 moving forwardly against the effort of the coil spring 109 until the piston engages the stop 34 where the blades are in their over-feathered condition.

A slotted rotatable element (not shown) is arranged to be driven by the rotor 12 and is positioned at that end portion of the shaft 26 remote from the bevel gear 25. A locking peg (also not shown) is co-operable with the slotted rotatable element and is provided to ensure that the rotor stops in a predetermined rotational position to enable the ram air turbine to be retracted through a relatively narrow retraction slit in the wall of the aircraft. This locking peg is provided with a hooked end portion and the slot is of co-operable shape in cross-section so that positive stopping engagement by the peg with the rotatable element can occur only when the rotor, after effectively stopping, just commerces to rotate in the reverse direction. Such reverse rotation of the rotor is afforded by movement of the blades of the rotor into their "over-feather" condition which is just into the reverse pitch range. Such an arrangement is described in the specification of our United States Patent No. 3,149,678.

In operation of the ram air turbine 11, when it is extended into the slip-stream of the aircraft, the bladed rotor 12 commences to rotate, the hydraulic fluid within the annular reservoir 41/42 being forced radially-outwardly under centrifugal force against the inner surface of the spinner structure. The fixed scoop 47 receives hydraulic fluid from the annular reservoir and this is caused to flow radially-inwardly to the inlet 49 of the pump 50. Hydraulic fluid under pressure delivered by the pump passes to the annulus 61 of the governor control valve spool 51 through the passageway 52, the slot 77a, the interior of the element 77, the chamber containing the springs 78 and 88 and the passageway 53. As commencement of rotation occurs, the blades 13 are in a relatively coarse pitch condition, the shoulder portion 102 and stop 103 being in engagement. Also, at this initial condition the governor fly-weights 70 are held by the speeder spring 74 in their fully-radially-inward position so that the hydraulic fluid delivered under pressure to the control valve spool 51 is directed by the spool through the ports 60 and 66, passageway 67 and port 68 into the chamber 69 on the fine pitch side of the piston 33 of the pitch-change motor 30. The chamber 64 is at the same time placed in communication with drain. Consequently, the blades are moved in the fine pitch direction and the rotor 12 speeds up. At a speed condition predetermined by the speeder spring 74, the governor fly-weights 70 overcome the effort of the speeder spring, moving radially-outwardly to cause the spool 51 to move forwardly to its equilibrium position in which the lands 56 and 57 respectively close over the ports 59 and 60, the blades now assuming an appropriate position in their pitch-change range.

If due to an increase in the speed of the aircraft the speed of rotation of the ram air turbine rotor 12 increases, the governor fly-weights 70 move radially-outwardly about their knife-edges 73, causing the spool 51 to be displaced forwardly so that the pressure annulus 61 is brought into registry with the port 59 and the port 60 is brought into communication with drain. Hence, pressure fluid is supplied through the ports 59 and 62 into the chamber 64 so that the piston 33 and thus the blades 13 are moved in the coarse pitch direction, the resultant increase in pitch bringing the speed of the rotor back to its datum setting.

If, conversely, the speed of the aircraft falls so that the speed of rotation of the rotor 12 decreases, then the governor fly-weights 70 move radially-inwardly whereupon the spool 51 moves rearwardly. Thus, pressure fluid in the annulus 61 is now placed in communication, through the ports 60 and 66, passageways 67 and port 68, with the chamber 69, while the chamber 64 is placed in communication with drain through the ports 62 and 59 and the hollow interior of the spool. Hence the piston 33 moves thus the blades 13 move in the pitch-fining direction, the decrease in pitch resulting in the speed of rotation of the rotor being restored to its datum setting.

When it is required to retract the ram air turbine into the aircraft fuselage, the rod member 93 is moved upwardly in FIGURE 4 of the drawing so that the bellcrank lever 89 moves in a clockwise direction about the pivot 90 and the rod members 86 and 87 are displaced forward axially against the effort of the coil spring 88. Upon engagement of the member 87 with the spool 51 the governor fly-weights 70 are overridden and the land 56 fully uncovers the port 59 so that pressure fluid in the annulus 61 passes through the port 59 and the port 62 into the chamber 64. At the same time the chamber 69 is placed in communication with drain through the port 68, passageway 67, port 66, port 60 and the hollow interior of the spool. Hence the piston 33 of the pitch-change motor 30 moves in the forward direction until it abuts the shoulder 110 whereupon the abutment sleeve 108 is displaced forward axially against the effort of the coil spring 109 moving the shoulder 107 away from the shoulder 106 so that the blades 13 move on to the "over-feathered" condition which is just inside the negative pitch-change range, such movement of the blades being at a relatively rapid rate. In so moving beyond the coarse starting pitch set by the stop 103, the piston 33 leaves the sleeve 104 and spring 65 behind. As the rotational speed of the rotor reduces as a result of the increasing pitch, the hooked locking peg is unable to engage the co-operable slot in the rotatable element until the blades have actually moved into their reverse pitch condition, the rotor by then having stopped and thereafter just commenced reverse rotation. Upon engagement of the peg, the rotor is locked in the predetermined rotational position so that the ram air turbine can be retracted through the slit in the wall of the aircraft. As this occurs, down-lock means (not shown) are automatically released and the retraction jack is then operable to retract the ram air turbine into the stowage zone.

During the process of stopping and locking in the predetermined rotational condition, the blades 13 of the rotor 12 are held in their reverse pitch condition against the loading of the coil spring 109 by the hydraulic pressure maintained by the accumulator formed by the piston 96, sleeve 95 and coil spring 98. During the run-down of the turbine rotor as the blades move into the "over-feathered" condition, the supply pressure produced by the pump 50 gradually diminishes, but the pressure maintained in the chamber 99 is sufficient to carry the blades into their "over-feathered" condition. The pressure in the chamber 99 is also sufficient to hold the piston 33 of the pitch-change motor 30 with sufficient hydraulic force to maintain the coil spring 109 compressed even when the rotor has ceased to rotate and the pump is no longer pumping.

Following release of the down-lock and operation of the retraction jack, the ram air turbine is raised towards its stowed position, and during this movement the cam means at the upper end portion of the leg 20 of the ram air turbine is effective to displace the rod members 93, 87 and 86 to cancel the overriding effect upon the speed governor 70. Thus the spool 51 moves rearwardly, now under the control of the governor speeder ring 74. Since in the stopped condition of the rotor the fly-weights 70 are sensing an "under-speed" condition, they move radially-inwardly about their knife-edges 73 enabling the speeder spring 74 to displace the spool 51 in said rearward direction. This rearward movement is sufficiently far for the port 59 to be fully opened to the annulus between the lands 55 and 56, and since this annulus is in communication with drain through the hollow interior of the spool 51 hydraulic fluid in the chamber 64 is exhausted to drain. Further, the residual pressure still applied by the accumulator 95, 96, 98 and which is applied through the passages 52 and 53 into the annulus 61 between the lands 56 and 57, is now directed through the ports 60 and 66, the passageway 67 and the port 68 into the chamber 69 on the forward side of the piston 33 of the pitch-change motor 30.

Under the above conditions the piston 33, which also has the coil spring 109 bearing upon it through the intermediary of the abutment sleeve 107, moves rearwardly of the hub until the shoulder 107 abuts the shoulder 106.

The diminishing pressure in the accumulator is insufficient to move the piston 33 further because the coil spring 65 is now effective behind it again, but with the piston 33 maintained against the shoulder 110 and, with the shoulder 107 abutting the shoulder 106, the piston is maintained in the position where the stop 103 engages the shoulder portion 102 corresponding to the relatively coarse pitch setting of the blades suitable for starting of the ram air turbine when it is next ejected into the slip-stream.

Upon full retraction of the ram air turbine into the stowage zone, up-lock means are engaged.

When the pilot requires to re-extend the ram air turbine into the slip-stream he selects extension so that the up-lock is released whereupon the ram air turbine hinges downwardly under gravity about its pivotal connection with the aircraft structure.

The down-lock means, which are rendered effective automatically as the ram air turbine reaches its fully extended condition, are inter-connected with the locking peg. The engaging movement of the down-lock means is caused to effect withdrawal of the locking peg from its co-operable slotting in the rotatable element (not shown) and thus the turbine rotor is not free to rotate in the slip-stream of the aircraft until full extension of the ram air turbine has taken place.

Also, upon such extension, the cam means at the upper end portion of the leg 20 maintains the rod members 93, 86 and 87 in their position in which they have no overriding effect upon the governor, and thus on release of the locking peg from the rotatable element, the blades are able to move from their initial coarse pitch starting condition into a finer pitch under the control of the governor, and the turbine quickly builds up its rotational speed to a value predetermined by the setting of the speeder spring 74.

The accessories driven by the now-operating ram air turbine come into full effect and the governor of the turbine maintains the rotational speed of the bladed rotor and of the accessories at a substantially constant value throughout substantially the complete flight parameter of the aircraft.

In an alternative embodiment of the invention instead of providing the accumulator in association with the passageway which connects the pump to the control valve, the displaceable abutment sleeve is connected to the piston of an auxiliary piston-and-cylinder device. A branch passageway is taken from the piston which connects the control valve with the coarse pitch side of the pitch-change motor, to the auxiliary cylinder so that when the piston of the pitch-change motor is moving in the coarse pitch direction the displaceable abutment sleeve is moved to its reverse pitch position to permit the blades to move straight into their reverse pitch condition if such coarsening movement is by way of governor override. A non-return valve is provided in the branch passageway having a bleed which permits low-rate back-flow from the auxiliary cylinder when the coarse pitch pressure supply is reduced to zero upon stopping and locking of the rotor. Thus with stopping of the rotor, the displaceable abutment sleeve is able to move slowly back under the effort of its spring to move the piston of the pitch-change motor back into a position such that the blades are in positive pitch in readiness for re-starting the turbine following eventual re-extension and unlocking of the rotor.

In another alternative embodiment of the invention the arrangement is such that the accumulator need not be provided. Here the blades of the rotor are coarsened and the rotor caused to slow down, there being just sufficient pressure developed by the pump to cause the blades to move just into reverse pitch. Simultaneously, with the peg-locking function, however, the displaceable abutment moves away from its reverse pitch position, the blades then being caused to reach the positive pitch range just as the down-lock means are released and retraction of the wind motor is automatically commenced.

Although in the first-above described embodiment the ram air turbine is extended into the slip-stream under gravity, in other embodiments the retraction jacks are double-acting so that the ram air turbines are extended, as well as retracted, under hydraulic power.

Again, although in the first-above described embodiment movement of the blades back from the negative pitch range into the positive pitch range is caused to occur as the ram air turbine is being retracted, in other embodiments such movement of the blades is instead caused to occur after completion of retraction, the cam means at the upper end portion of the leg being of suitable form for initiating this.

We claim:
1. A wind motor designed so as to be suitable for use in vehicles, such as aircraft for driving accessories, for example, hydaulic pumps, and being movable from a stowed inoperable position within the vehicle to an extended operable position externally of and in the slip-stream of the vehicle, and being retractable from the extended position to the stowed position, said wind motor comprising in combination:
   (a) a body portion, having pivotal mouting means to afford the wind motor its extendability and retractability,
   (b) a bladed rotor mounted for rotation upon the body portion, such rotation occurring when the wind motor is in its extended condition,
   (c) positioning means operable to ensure that the bladed rotor is stopped in a predetermined rotational position so that the wind motor presents its overall smallest cross-sectional area to an opening in the wall of the vehicle for retraction of the wind motor through that opening, and,
   (d) speed-governor-controlled hydraulically-operable pitch-changing mechanism for adjusting the pitch of the blades to maintain substantially constant speed operation of the rotor, a piston-and-cylinder device, forming part of said mechanism, being operably connected to the blades and having displaceable stop means which, when the governor is overridden to initiate stopping of the rotor prior to retraction, permits movement of the blades just into the reverse pitch range, but which, when the rotor has been stopped in said predetermined rotational position and after retraction has commenced, is automatically displaceable then to move the blades just back into the positive pitch range.

2. A wind motor as claimed in claim 1, wherein the displaceable stop means comprises an abutment sleeve normally spring-urged against a shoulder formed upon a core member within the hub of the rotor and within the cylinder of the piston-and-cylinder device, an abutment formed on the abutment sleeve lying in the path of movement of the piston of the piston-and-cylinder device, thereby to form a stop which corresponds to a coarse pitch starting angle of the blades.

3. A wind motor as claimed in claim 2, wherein the abutment sleeve is so constructed that when the piston is urged under hydraulic pressure onto the sleeve upon overriding of the governor, the spring load is overcome so that the sleeve is moved away from the shoulder on the core member to permit the piston to move further just into the reverse pitch range.

4. A wind motor as claimed in claim 2, wherein an accumulator is provided in operable association with the piston-and-cylinder device and is so constructed and positioned as to be operable to maintain the abutment sleeve in the reverse pitch position during stopping of the rotor, but as the wind motor is being retracted or after it has been retracted, the accumulator is caused to be no longer effective to maintain the sleeve in the reverse pitch position, so that the sleeve moves back to its position of engagement with the shoulder formed on the core member, this position corresponding to the starting pitch angle of the blades.

5. A wind motor as claimed in claim 1, wherein the piston-and-cylinder device is contained within the bladed rotor and its longitudinal axis is coincident with the rotational axis of the bladed rotor.

6. A wind motor as claimed in claim 1, wherein the fluid pressure for operation of the piston-and-cylinder device is derived from a pump of positive-displacement type whose rotor has its axis of rotation coincident with that of said bladed rotor, the pump rotor being driven by the bladed rotor.

7. A wind motor as claimed in claim 1, wherein the speed governor is of centrifugal fly-weight type whose axis of rotation is coincident with that of the bladed rotor.

8. A wind motor as claimed in claim 7, wherein said governor is operably connected to a spool type control valve, axial displacement of which, in dependence upon speed signals from the governor controls the supply of hydraulic fluid under pressure from said pump to said piston-and-cylinder device.

9. A wind motor as claimed in claim 8, wherein the accumulator comprises an annular piston housed in an annular chamber formed within the hub of the bladed rotor, the chamber formed on one side of said piston being in communication through porting with a passage connecting the pump to the control valve and the chamber on the other side of the piston housing spring means for urging the piston in such manner as to maintain fluid pressure in said passage when said pump is slowing down or has stopped.

10. A wind motor as claimed in claim 8, wherein the governor and spool-type control valve are so constructed, and feathering means are so co-operable therewith, that for slowing down and stopping of the bladed rotor the governor is overridden and the stool-type valve so positioned that hydraulic fluid is directed under pressure from said pump to that side of the said piston-and-cylinder device appropriate for feathering of the blades.

11. A wind motor as claimed in claim 10, wherein the governor and the spool-type control valve are so constructed that when said bladed rotor has stopped and overriding of said governor for feathering is cancelled, a speeder spring, forming a part of the governor urges the spool type control valve into a position in which it isolates the accumulator from the side of the piston-and-cylinder device appropriate to pitch increase of the blades, placing that side in communication with drain, and directs fluid pressure from said accumulator to the other side of said piston-and-cylinder device, thereby to enable said spring loaded abutment sleeve to effect movement of the blades to their starting pitch angle.

12. A wind motor as claimed in claim 6, wherein a reservoir for containing the hydraulic fluid of the pitch-changing mechanism is defined by spinner structure, rotatable with the bladed rotor, and non-rotatable scoop means so co-operable with the reservoir as to be capable of receiving fluid urged radially-outwardly under centrifugal force within the reservoir and of directing this fluid to the inlet of said pump.

13. A wind motor as claimed in claim 1, wherein said positioning means comprises a locking peg co-operable with a slotted element rotatable with and driven by said bladed rotor.

14. A wind motor as claimed in claim 13, wherein said locking peg is provided with a hooked end portion and the slotted element is of such shape in cross-section as to ensure positive stopping engagement by the peg with the rotatable element upon commencement of reverse rotation of said bladed rotor as said blades move just into the reverse pitch range.

References Cited

FOREIGN PATENTS 1,312,256  11/1962  France.

EDGAR W. GEOGHEGAN, *Primary Examiner.*

E. A. POWELL, Jr., *Assistant Examiner.*